United States Patent [19]

Boland et al.

[11] 4,434,970

[45] Mar. 6, 1984

[54] ADJUSTABLE LOAD BRACING BAR

[75] Inventors: John D. Boland, Jackson; Fred C. Kresky, Richland, both of Mich.

[73] Assignee: Aeroquip Corporation, Jackson, Mich.

[21] Appl. No.: 471,069

[22] Filed: Mar. 7, 1983

Related U.S. Application Data

[63] Continuation of Ser. No. 255,650, Apr. 20, 1981, abandoned.

[51] Int. Cl.³ .............................................. B66F 1/04
[52] U.S. Cl. .................................................. 254/108
[58] Field of Search .......................... 254/113–118, 254/105–112, 98, 106, 133 A

[56] References Cited

U.S. PATENT DOCUMENTS

| | | | |
|---|---|---|---|
| 116,534 | 7/1871 | Ballentine | 254/118 |
| 546,704 | 9/1895 | Lynn | 254/116 |
| 820,983 | 5/1906 | Minnich | 254/112 |
| 2,135,080 | 11/1938 | Johnston | 254/108 |
| 3,049,328 | 8/1962 | Bishop | |
| 3,090,600 | 5/1963 | Smith | |
| 3,124,013 | 3/1964 | Ulm | 254/108 |
| 3,325,095 | 6/1967 | Mueller et al. | 254/100 |
| 3,738,613 | 6/1973 | Hollis | 254/98 |
| 3,788,604 | 1/1974 | Cameron | 254/108 |

Primary Examiner—Robert C. Watson
Attorney, Agent, or Firm—Beaman & Beaman

[57] ABSTRACT

A load bracing bar frictionally supported between partitions to restrain cargo movement comprising an elongated bar consisting of telescopingly interconnected portions. An elongated tooth track is homogeneously defined in one of the bar portions of the material thereof, and a lever and dog device mounted upon the other bar portion selectively engages the teeth of the track to extend the bar portions longitudinally upon lever action. The lever is pivotal to a position which retracts the dog from the tooth track for retracting the bar portions, and a spring biased detent on the lever positively locks the lever and bar in the extended condition.

8 Claims, 7 Drawing Figures

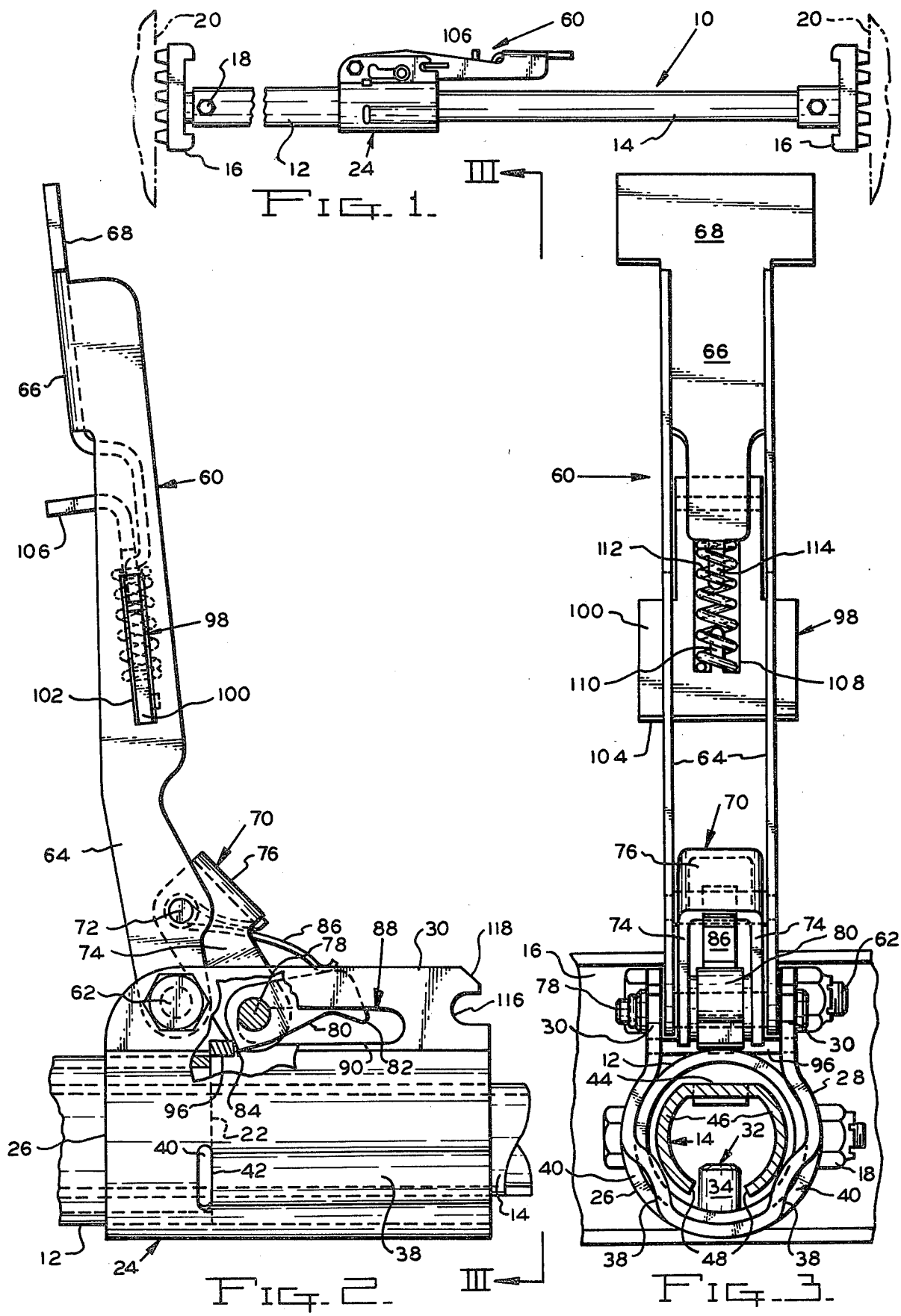

ADJUSTABLE LOAD BRACING BAR

This application is a continuation of Ser. No. 255,650 filed Apr. 20, 1981 now abandoned.

BACKGROUND OF THE INVENTION

Bracing bars are often utilized within cargo compartments, such as within a truck, to prevent the shifting of a partial load. Bracing bars may utilize fittings at their ends which are received within fittings mounted upon the partitions and walls of the cargo compartment, or the load bracing bar may be frictionally held in place by frictional engagement of the bar ends with the cargo partitions. The frictionally retained bracing bar is economical, requires no modifications to the cargo compartment, and permits wide latitude in the installment of the bar within the cargo compartment.

Frictionally retained bracing bars commonly utilize means for expanding the length of the bar to accomodate the bar to the particular width of the cargo compartment, and force the ends of the bar into firm frictional engagement with the cargo compartment partitions. Such adjustment is achieved by varying the length of the bar, and retaining the bar at the length which produces the desired functional forces.

Load bracing bars often employ telescopingly interconnected portions to permit adjustment of the bar length, partition engaging friction pads being mounted upon the outer ends of the bar portions. The expanding adjustment of the bar may be produced by springs wherein a biasing force is maintained upon the bar portions to maintain frictional engagement with the partitions. An example of such a spring biased bracing bar is shown in U.S. Pat. No. 3,090,600. Spring biased bracing bars have the advantage of maintaining a uniform frictional engagement with the cargo partitions, but the frictional forces are limited by the biasing forces produced and spring biased bars are usually employed only in light duty applications.

Heavier duty load retaining bars may include a gear and rack arrangement for producing a positive extension of the telescoped bar portions capable of producing high frictional forces between the bar and the cargo partitions. Such bracing bars may utilize a linear toothed rack affixed to one of the bar portions and a pinion gear rotatably mounted upon the other bar portion selectively engages the teeth of the rack for extending the portions into engagement with the cargo partitions. Such bracing bars, as typified in U.S. Pat. No. 3,049,328, are expensive to manufacture in view of the machined tooth rack and gear, and are often bulky and heavy in view of the necessity to attach the rack and gear structure to the bar in a high strength manner.

It is an object of the invention to provide an adjustable load bracing bar capable of producing a positive high pressure bar extension wherein the mechanism for extending the bar is of a simple and economically producible form.

A further object of the invention is to provide an adjustable load bracing bar of a high force producing type wherein a lever and dog mechanism is utilized in conjunction with a toothed track homogeneously defined upon one of the bar portions.

Another object of the invention is to provide an adjustable load bracing bar utilizing a telescoping bar portion having a homogeneous tooth track defined thereon capable of transmitting significant forces and employed in conjunction with a lever mounted dog wherein the homogeneous toothed track construction simplifies manufacture, results in concise design and handling characteristics, and minimizes the number of components as compared with prior art bracing bars.

Yet another object of the invention is to provide an adjustable load bracing bar which may be readily handled and installed by one person, initial longitudinal extension of the bar being manually producible, and such initial expansion being sufficient to retain the bar in place prior to further extension through a lever actuator.

An additional object of the invention is to provide an adjustable load bracing bar utilizing a lever and pivoted dog arrangement wherein the dog cooperates with a homogeneous tooth track, the lever being pivotal between positions which permit the dog to be released from the tooth track for retracting the bar portions, and lever movement permits the spring biased dog to engage the track and longitudinally extend the bar portions during lever operation. Full extension of the bar being retained by a positive acting lever detent.

In the practice of the invention the load bracing bar consists of two telescopingly interconnected portions each having a partition engaging pad at its outer end. One of the bar portions, the inner portion in the disclosed embodiment, includes a tooth track homogeneously formed thereon extending in the longitudinal direction of the bar portion. The tooth track is formed by a stamping or rolling procedure wherein the teeth of the track are formed of the metal of the bar portion and extend transversely to the bar portion length. The toothed bar portion is of a tubular configuration, and includes elongated key means defined thereon for cooperating with a key member mounted upon the other bar portion in order to prevent rotation between the bar portions.

A lever support is mounted upon the inner end of the larger diameter tubular bar portion and includes abutment means for engaging the associated portion inner end to resist axial displacement during bar extension. A pivotal lever mounted upon the lever support includes a linked pivotal dog arrangement which includes a dog biased toward engagement with the toothed track of the other bar portion. The lever is pivotal to a release position wherein the dog is disengaged from the toothed track to permit the bar portions to be retracted, and pivoting of the lever in the opposite direction permits the dog to engage the toothed track, and further pivoting causes the dog to extend the toothed bar portion in an axial direction to increase the length of the bar and produce the frictional engagement with the cargo compartment partitions. Detents mounted upon the lever lock the lever in the bar extended position and require positive manual operation to release the bar from its extended position.

BRIEF DESCRIPTION OF THE DRAWINGS

The aforementioned objects and advantages of the invention will be appreciated from the following description and accompanying drawings wherein:

FIG. 1 is an elevational view illustrating a load bracing bar in accord with the invention as installed in the expanded condition, FIG. 2 is a side elevational, enlarged, detail view, partially sectioned, illustrating the lever and dog mechanism with the lever in the dog release position, FIG. 3 is an elevational sectional view as taken along Section III—III of FIG. 2.

DESCRIPTION OF THE PREFERRED EMBODIMENT

Figure 4:
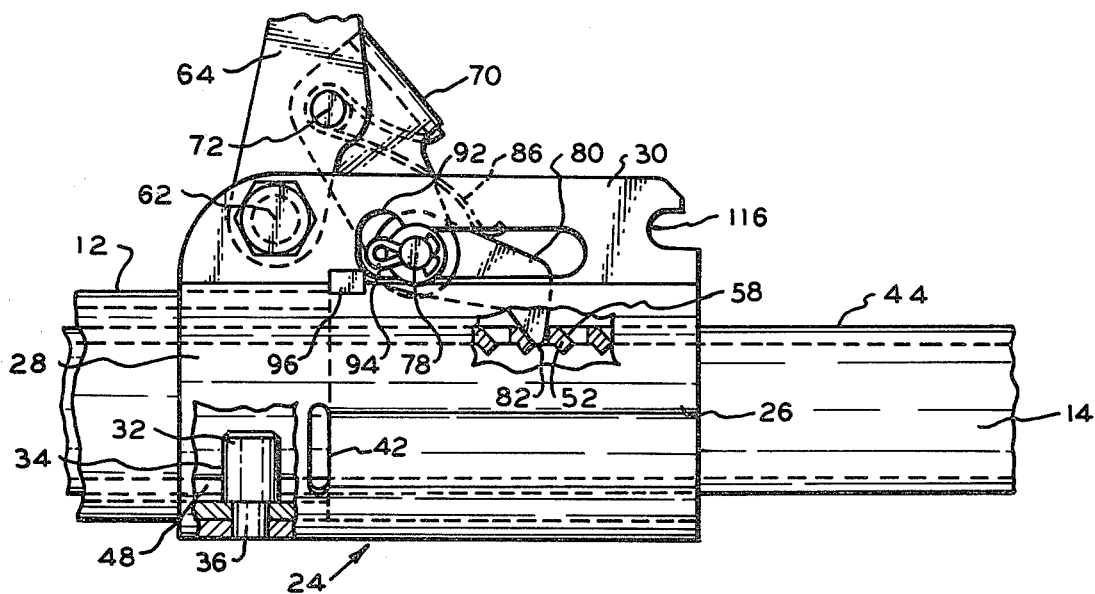
FIG. 4 is an elevational, detail, enlarged view of the lever support, partially in section, illustrating the lever and the dog in the initial track engaging position.

The bracing bar in accord with the invention is generally indicated at 10, FIG. 1, and includes a tubular portion 12 into which the tubular portion 14 is telescopingly received. The outer ends of the portions 12 and 14 are each provided with a partition engaging pad 16 mounted to the associated bar portion of a bolt 18. The pads 16 are combination metal-elastomer assemblies utilizing a plurality of elastomeric teeth or the like to augment frictional engagement with the spaced cargo compartment partitions or walls as represented at 20. The cargo partitions 20 may constitute the side walls of a truck or cargo trailer.

The bracing bar 10 in accord with the invention is utilized in the usual manner wherein the bar is placed against the load to be braced, and expanded into frictional engagement with the partitions 20 such that the bar restrains the load or cargo in a direction lateral to the bar length.

The bar portion 12 comprises a cylindrical tube having a squared inner end 22, FIG. 2. The portion 12 constitutes the primary lengthwise dimensional element of the bracing bar 10.

A lever support, generally indicated at 24, is mounted upon the inner end region of the portion 12 and comprises a sheet metal collar 26 having a generally cylindrical portion 28 circumscribing the portion 12 adjacent the inner end 22 and the collar includes parallel upstanding extensions 30 which extend above the configuration of the portion 12. A stud or projection 32, FIG. 4, is mounted within the portion 12 adjacent the inner end 22 and includes an enlarged internal portion 34 radially extending inwardly, and a smaller diameter stem 36 extends through a hole defined in the portion 12 and a hole formed in the collar 26. The projection 32 may be affixed in position by any standard mechanical means, such as by an interference fit, welding, or the stem 36 could be threaded and extend beyond the collar for receiving a nut.

While the configuration of the collar portion 28 is substantially cylindrical, the collar portions 38, FIG. 3, are radially indented as will be noted, and a pair of oblong openings 40 defined within the collar portion 28 each include an edge 42 defining the leftmost edge of the associated indented portion 38, FIG. 2. The portion 12 inner end 22 engages the slot's edge 42, and the slot edge 42 constitutes an abutment against the inner end 22 which prevents axial movement of the collar 28 upon the portion 12 toward the left, FIG. 2, due to axial forces imposed thereon during bar extension.

The bar portion 14 is also of an elongated tubular form, and, diametrically, is smaller than the portion 12 so as to be telescopingly receivable therein. Further, the bar portion 14 is of a significantly lesser longitudinal length than the bar portion 12 in that the portion 12 constitutes the primary length producing bar dimension, as mentioned above. The cross sectional configuration of the portion 14 is best appreciated from FIG. 3, which includes a relatively flat upper portion 44 from which depend cylindrical lateral segments 46. The segments 46 each terminate at an end edge 48 wherein a circumferential spacing exists between the edges 48 sufficient to receive the stud 32 mounted within the portion 12 and the collar 26. The edges 48 define a parallel key groove in the portion 14, and the cooperation with the stud 32 prevents relative rotation between the portions 12 and 14 throughout longitudinal adjustment of the bar 10.

Figure 6:
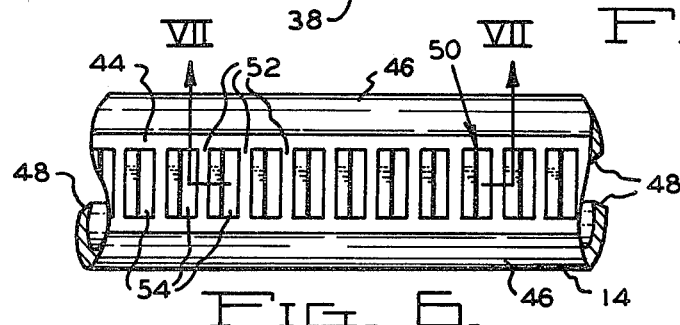
FIG. 6 is a top plan view of the toothed track portion of the bracing bar illustrating the track.
Figure 7:
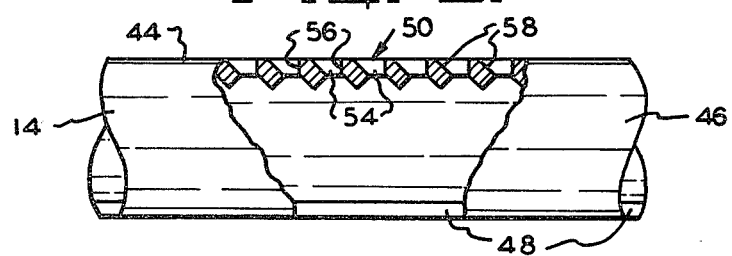
FIG. 7 is a side elevational view of the tooth track bar portion, a sectioned portion thereof being taken along Section VII—VII of FIG. 6.

A toothed track 50 is homogeneously defined in the flat portion 44, FIGS. 6 and 7, and the toothed track consists of a plurality of teeth 52 homogeneously formed of the material of the portion 14. Preferably, the teeth 52 include openings 54 defined therebetween which communicate with the interior of the portion 14 wherein the teeth will be self-cleaning, and each tooth includes an abutment surface 56 for engagement with the dog, as later described. Each tooth also includes an obliquely disposed upper cam surface 58 which will lift the dog as the portion 14 is manually extended. The teeth 52 may be formed within the portion 44 by known stamping or rolling techniques, and in the construction of the portion 14 the stock material will usually be of a planar form while the tooth track 50 is being formed, and after tooth formation the stock is rolled or otherwise shaped to define the cylindrical segments 46.

The tooth track 50 need not extend the entire length of the portion 14, but the tooth track will normally be formed adjacent the inner end of the portion 14 and extend to the right, FIG. 1, between twelve and twenty inches, depending upon the dimensional limit accommodations desired for the bar 10.

Bar extension is produced by the lever 60 pivotally mounted upon the collar 26 between the extensions 30 by pivot bolt 62. The lever 60 is formed of a sheet steel material by a stamping operation and includes spaced parallel legs 64 interconnected by a base portion 66 which defines the handle region 68. A stamped sheet metal link 70 is pivotally connected to the lever between the legs 64 upon a pivot pin 72. The pivot pin 72 is of a length less than the spacing between the collar extensions 30, and the link 70 includes arms 74 extending from connecting base 76, the lower end of the arms having a hole defined therein for receiving the pivot pin 78.

The dog 80 is pivotally mounted upon the pivot pin 78 intermediate the link arms 74, and the dog includes a tooth engaging apex 82 at its free end, and at its pivoted end the dog includes an abutment engaging surface 84 defined below the pivot pin 78. A leaf spring 86 extending about pivot pin 72, having one end engaging the link base 76 and the other end bearing upon the dog 80, biases the dog 80 in a clockwise direction. FIG. 2, toward engagement with the tooth track 50 of bar portion 14, as later apparent.

Figure 5:
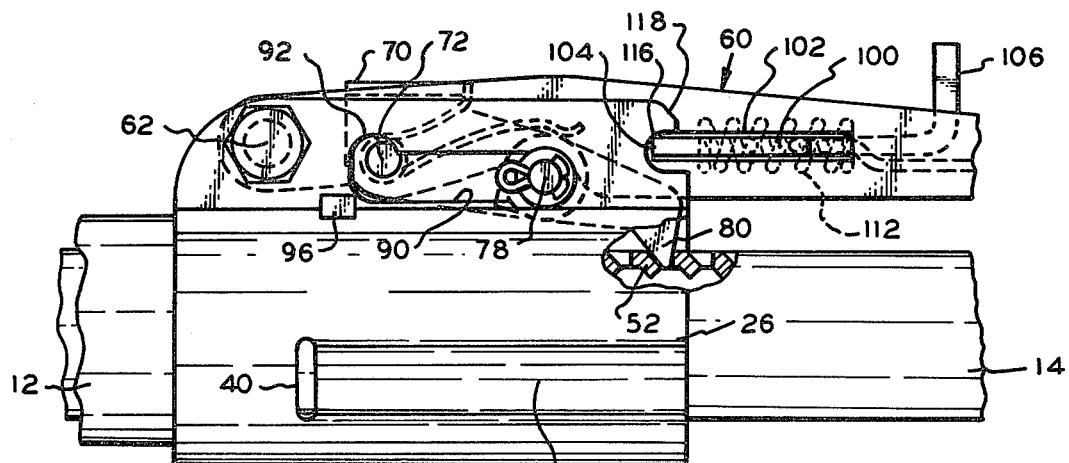
FIG. 5 is an enlarged, elevational, detail view, partially in section, illustrating the dog and lever apparatus in the bar extended position.

The pivot pin 78 is of sufficient length to extend through slots 88 defined in the collar extensions 30, and as will best be appreciated from FIGS. 4 and 5, the slots 88 include a portion 90 parallel to the length of the bar 10, and at the left end a slot notch 92 is formed which extends away from the bar portion 12. A washer and cotter key assembly 94 is employed to maintain the headed pivot pin 78 in position and within the slots 88.

An abutment bar 96 having a rectangular configuration is mounted upon the collar 26 interposed between the extensions 30, and the abutment bar will engage the dog surface 84 when the lever 60 is raised to its maximum counterclockwise condition, as represented in FIG. 2.

In order to lock the lever 60 in its operative extended position a detent generally indicated at 98 is mounted upon the lever. The detent comprises a plunger plate 100 having lateral portions which extend through rectangular slots 102 defined in the lever legs 64. The plate 100 includes an end 104, and the detent plunger is bent upwardly to define an actuating handle 106 which extends beyond the confines of the lever 60. The detent plunger 100 is provided with a spring receiving slot 108 and a spring locating stud 110 whereby a compression spring 112 may be located within the slot 108, and a spring anchor stud 114 defined upon an extension of the lever base 66 supports the other end of the spring. Thus, the spring 112 will bias the detent plunger 100 toward the pivot bolt 62, and the operator may pull the detent plunger toward the lever base 66 by means of the actuating handle 106.

Each of the collar extensions 30 is provided with detent receiving notches 116, FIG. 2, and a cam surface 118. Thus, upon sufficient pivoting of the lever 60 in the clockwise direction in the detent plunger 100 will engage the cam surfaces 118 retracting the detent plunger against the force of the spring 112, and permit the detent plunger to be received within the notches 116, as shown in FIG. 5.

To use the adjustable load bracing bar of the invention the operator grasps the bar 10 by placing one hand upon the portion 12 and the other hand upon the portion 14. The lever 60 will be in the "engage" position as shown in FIG. 4. In this position the lever 60 will be extending substantially at right angles to the length of the bar 10, the pivot pin 78 will be located in the slots 88 at the location shown in FIG. 4, and the biasing force exerted on the dog 80 by the spring 86 will engage the dog apex 82 with a tooth 52 of the track 50. Thus, it will be appreciated with the lever 60 in the "engage" position of FIG. 4 the bar portion 14 will be prevented against movement into the portion 12 by engagement of the dog 80 and associated tooth, but the bar portion 14 can be extended to the right by imposing an axial force upon the portion 14 which will cause the teeth cam surfaces 58 to lift the dog as it rides over the teeth 52.

The operator positions the load bar 10 within the cargo compartment as desired, and once the positioning is made the operator extends the portion 14 relative to the portion 12 manually permitting the dog to ride over the teeth. This manual adjustment will frictionally engage the pads 16 with the partitions 20, preliminarily hold the bracing bar in the desired position in that retraction of the bar portion 14 is prevented by engagement of the dog 80 and teeth 52. Thereupon, the operator grasps the lever 60 and pivots the lever in a clockwise direction, FIGS. 4 and 5, from the "engage" position of FIG. 4 to the "extend" position of FIG. 5. This clockwise movement of the lever 60 causes the pivot pin 78 to slide to the right in slots 88 translating the dog 80 and bar portion 14 to the right, and this movement will be in the nature of approximately one inch or more. This extension of the length of the bar 10 will produce a firm, high pressure engagement of the partition pads 16 with the partitions 20 firmly holding the bracing bar in place, and during the final pivoting of the lever 60 the detent plunger 100 will engage the cam surfaces 118 momentarily retracting the plunger to permit the detent to be received within the collar notches 116 locking the bar 10 in its operative extended position.

When it is desired to remove the bracing bar 10 from the partitions 20 the operator grasps detent handle 106, shifts the detent plunger 100 to the right. FIG. 4, and pivots the lever 60 in the counterclockwise direction. This lever action will permit the portion 14 to retract into the portion 12 due to the release of compressive forces within the bar, and as the operator continues to rotate the lever 60 in the counterclockwise direction the pivot pin 78 will enter the slot notch 92, the dog surface 84 engages the abutment bar 96, and this engagement will pivot the dog 80 in the counterclockwise direction, FIG. 2, raising the dog to a "release" condition out of engagement with the tooth track 50. This disengagement of the dog and tooth track permits the bar portion 14 to be fully retracted into portion 12 and the bracing bar is readily removed from engagement with the partitions 12.

The lever 60 will not remain in the release portion of FIG. 2 without being held therein by the operator due to the biasing force imposed upon the dog by the leaf spring 86. Upon the operator releasing lever 60 the lever will assume the engage position of FIG. 4 and the bar will automatically be ready for the next installation.

The fact that the brace bar of the invention can easily be installed by one operator, and will be preliminarily retained in its desired position during the initial manual adjustment facilitates use of the brace bar as compared with most available bars which are not capable of retaining an extended condition without the manual operation of locking or extension apparatus. As the initial manual adjustment will produce a firm frictional engagement with the cargo compartment partitions even prior to operation of the lever 60 excellent frictional engagement with the partitions is achieved during lever operation, and the "wedging" that is often utilized with load bracing bars is not necessary with the disclosed apparatus. Further, the formation of the tooth track 50 homogeneously with the bar portion 14, and the fact that the majority of the components are formed of stamped sheet steel results in an economically manufacturable apparatus which is rugged, yet of relatively light weight.

It is appreciated that modifications to the inventive concepts may be apparent to those skilled in the art without departing from the spirit and scope of the invention.

We claim:

1. In an adjustable load bracing bar adapted to be supported between spaced partitions, in combination, an elongated bar having outer ends, said bar comprising first and second elongated portions each having inner ends telescopingly interconnected, a plurality of teeth defined on said first portion forming a tooth track substantially parallel to the length of said first portion, a lever support defined on said second portion adjacent the inner end thereof, a hand operated lever pivotally mounted upon said lever support pivotal between retract, engage and extend positions, a slot defined on said lever support extending parallel to said positions, a dog, a first pivot pivotally mounting said dog upon said lever, said dog having a second pivot slidably received within said slot, biasing means mounted on said lever biasing said dog toward said tooth track, said dog engaging said track at and between said lever engage and extend positions, and partition engaging means defined upon said bar outer ends, pivoting of said lever from said engage to said extend positions translating said second dog pivot within said slot and translating said dog in a direction telescopingly extending said first portion relative to said second portion.

2. In an adjustable load bracing bar as in claim 1, detent means interposed between said lever and said lever support releasably retaining said lever in said extend position.

3. In an adjustable load bracing bar as in claim 2, said detent means comprising a plunger slidably mounted on said lever, a spring mounted on said lever biasing said plunger in a locking direction, and a notch defined in said lever support aligning with and receiving said plunger upon said lever being pivoted to said extend position.

4. In an adjustable load bracing bar as in claim 1, dog abutment means defined upon said lever support adjacent an end of said slot, said abutment means engaging said dog upon said lever being pivoted to said retract position and said second dog pivot being translated to said slot end pivoting said dog in a direction against the force of said biasing means disengaging said dog from said tooth track to permit said first bar portion to telescopingly retract into said second bar portion.

5. In an adjustable load bracing as in claim 1, said first bar portion being formed of formed steel metal, and said teeth being stamped into said first bar portion.

6. In an adjustable load bracing bar as in claim 1 wherein said lever support comprises a sheet metal collar circumscribing at least a portion of said bar second portion adjacent its inner end, an axial portion of said collar extending beyond the inner end of said second bar portion, said collar axial portion being deformed inwardly to define an integral radial shoulder in axial alignment with said second bar portion inner end for engagement therewith to resist axial displacement of said lever support collar upon said second bar portion upon axial compressive forces being imposed upon said bar.

7. In an adjustable load bracing bar adapted to be supported between spaced partitions, in combination, an elongated bar having outer ends and defined by first and second elongated substantially cylindrical tubular portions each having an inner end, said first portion inner end being telescopingly received within said second portion inner end, partition engaging means mounted upon said bar's outer ends, said first bar portion being defined by formed sheet metal having a generally tubular configuration including a pair of spaced opposed longitudinal edges defining a longitudinal slot extending the length of said first bar portion and including a toothed track, said track extending in the longitudinal direction of said first bar portion and comprising a plurality of spaced teeth homogeneously defined of the material of said first bar portion transversely disposed to the length of said first bar portion, a projection fixed relative to said second bar portion received within said first bar portion slot preventing rotation of said first portion relative to said second portion, a lever support mounted on said second bar portion adjacent said inner end thereof, a lever pivotally mounted upon said lever support pivotal between engage and extend positions, a dog pivotally mounted upon said lever engaging said tooth track whereby pivoting of said lever from said engage position to said extend position displaces said first bar portion outwardly with respect to said second bar portion inner end, releasable detent means mounted on said lever, and detent receiving means defined on said lever support receiving said detent at said lever extend position retaining said lever in said extend position.

8. In an adjustable load bracing bar as in claim 7, said detent means comprising a plunger slidably mounted on said lever, a spring mounted on said lever biasing said plunger in a locking direction, said detent receiving means comprising a notch defined in said lever support aligning with and receiving said plunger upon said lever being pivoted to said extend position.

* * * * *